US009233325B2

(12) United States Patent
Carlsson et al.

(10) Patent No.: US 9,233,325 B2
(45) Date of Patent: Jan. 12, 2016

(54) CENTRIFUGAL SEPARATOR AND A METHOD FOR CLEANING OF A GAS

(75) Inventors: Claes-Goran Carlsson, Tullinge (SE); Jan Skoog, Skogås (SE); Tommy Myrvang, Tullinge (SE); Jan Berntsson, Kvänum (SE)

(73) Assignee: ALFA LAVAL TUMBA AB, Tumba (SE)

( * ) Notice: Subject to any disclaimer, the term of this patent is extended or adjusted under 35 U.S.C. 154(b) by 556 days.

(21) Appl. No.: 12/675,556

(22) PCT Filed: Aug. 14, 2008

(86) PCT No.: PCT/SE2008/050921
§ 371 (c)(1),
(2), (4) Date: Feb. 26, 2010

(87) PCT Pub. No.: WO2009/029022
PCT Pub. Date: Mar. 5, 2009

(65) Prior Publication Data
US 2011/0056374 A1 Mar. 10, 2011

(30) Foreign Application Priority Data
Aug. 28, 2007 (SE) ...................... 0701940

(51) Int. Cl.
B01D 45/12 (2006.01)
B01D 45/14 (2006.01)
B04B 5/12 (2006.01)

(52) U.S. Cl.
CPC . B01D 45/14 (2013.01); B04B 5/12 (2013.01); B04B 2005/125 (2013.01)

(58) Field of Classification Search
USPC ........... 55/391, 434, 447, 466, 467, 468, 470, 55/474, 476; 95/31, 36, 267, 269, 270; 96/234, 235, 267, 281, 301, 366, 372, 96/373, 379, FOR. 157, FOR. 158
See application file for complete search history.

(56) References Cited

U.S. PATENT DOCUMENTS 404,606 A * 6/1889 De Brouwer .................... 261/89
900,062 A * 9/1908 Ernst ............................... 95/151
(Continued)

FOREIGN PATENT DOCUMENTS

DE 10153483 A1 5/2003
GB 296670 A 5/1929
(Continued)

OTHER PUBLICATIONS

EP Search Report; Application No. 08 794 146.4; Dated May 18, 2011.
(Continued)

Primary Examiner — Duane Smith
Assistant Examiner — Sonji Turner
(74) Attorney, Agent, or Firm — MKG LLC

(57) ABSTRACT

In a centrifugal separator and method for cleaning of gas containing solid and liquid impurities. A stationary casing encloses a separation space through which gas flows. An inlet channel extends to the separation space and forms an inlet for the gas to be cleaned. A rotating member is provided in the separation space downstream the inlet and rotates about an axis of rotation. The rotating member comprises a number of separation discs and brings the gas to rotate for separating by means of centrifugal forces a main part of the impurities from the gas. A gas outlet channel is provided downstream the rotating member for discharging the cleaned gas. A first outlet is provided for discharging the impurities. A supply member is configured to permit the supply of a separation aid humidifying the particles, which aid is in the form of an aerosol, to the gas to be cleaned.

10 Claims, 2 Drawing Sheets

(56) References Cited

U.S. PATENT DOCUMENTS

| | | | | |
|---|---|---|---|---|
| 2,913,232 A | * | 11/1959 | Silverman | 261/40 |
| 3,693,326 A | * | 9/1972 | Deane | 96/282 |
| 4,242,109 A | * | 12/1980 | Edwards | 96/282 |
| 4,544,379 A | * | 10/1985 | Elliott et al. | 95/224 |
| 4,713,096 A | | 12/1987 | Kajihara | |
| 4,881,956 A | * | 11/1989 | Jones | 95/219 |
| 5,851,396 A | | 12/1998 | Saget | |
| 6,383,260 B1 | * | 5/2002 | Schwab | 95/216 |
| 6,627,166 B1 | * | 9/2003 | Simon | 423/210 |
| 7,077,886 B2 | * | 7/2006 | Rosen | 95/218 |
| 7,749,310 B2 | * | 7/2010 | Lagerstedt et al. | 95/270 |

FOREIGN PATENT DOCUMENTS

| | | |
|---|---|---|
| GB | 1156711 | 7/1969 |
| GB | 1500117 | 2/1978 |
| JP | 01-070079 | 6/1989 |
| SE | 526815 | 11/2005 |
| WO | 2005087384 A1 | 9/2005 |
| WO | 2007094727 | 8/2007 |

OTHER PUBLICATIONS

Examination Report dated Feb. 14, 2012; issued in conjunction with European Patent Application No. 08794146.4.

Office Action (English Translation), Dated—Dec. 20, 2011, issued in conjunction with Japanese Patent Application No. 2010-52261.

Office Action for European Patent No. EP08794146.4-1356, dated Oct. 1, 2013.

Office Action for European Patent No. EP08794146.4-1356, dated Jul. 24, 2015.

* cited by examiner

CENTRIFUGAL SEPARATOR AND A METHOD FOR CLEANING OF A GAS

FIELD

The present invention refers generally to a centrifugal separator for cleaning of gases from impurities in the form of solid of liquid particles. More specifically, the invention refers to a centrifugal separator for cleaning of a gas containing impurities in the form of solid and/or liquid particles and method for cleaning of a gas containing impurities in the form of solid and/or liquid particles by centrifugation in a centrifugal separator.

BACKGROUND

This kind of centrifugal separator is intended for cleaning of gases, such as air, especially contaminated or heavily contaminated air. Thereby it can in particular concern air in industrial environments, for instance air immediately in the proximity of various kinds of machines. Furthermore, this kind of centrifugal separators may be intended to be used for cleaning of other gases. For instance exhaust gases from stationary or mobile combustion engines.

One problem in connection with such cleaning is that the impurities which are contained in the gas to be cleaned contain a large proportion of solid or liquid particles which are very small and/or which have a relatively low density. Such small particles are difficult to separate also by means of centrifugal separators. A further problem in connection with such cleaning is that the particulate impurities contained in the gas to be cleaned get caught in the rotating member, and especially to the separation discs which frequently are provided on the rotating member for rendering the separation efficient. Impurities, which may consist of both liquid and particulate impurities, form a more or less solid coating on the rotating member. This coating deteriorates the separation and makes it difficult to transport the impurities out from the separation space. Dry, i.e. solid, particles have a tendency to get caught on these surfaces, and thus form a relatively solid coating on the surfaces of the rotating member and in the separation space.

SUMMARY

The object of the present invention is to provide a centrifugal separator which facilitates the separation of impurities in the form of solid or liquid particles from a gas in a centrifugal separator, especially the separation of impurities having a large proportion of particles which are very small and/or has a low density. More specifically, it is aimed at a centrifugal separator which prevents impurities, in the form of solid or liquid particles in a gas to be cleaned, from getting caught on inner surfaces defining the separation space and on surfaces of the rotating member.

In an embodiment of the present invention, the centrifugal separator comprises a supply member which is configured to permit the supply of a separation aid humidifying the particles, which aid is in form of an aerosol, to the gas to be cleaned.

By means of such a separation aid, the transport of the gas to be cleaned through the separation space, and especially through the rotating member is facilitated. The separation aid prevents in an efficient manner particles of the impurities from getting caught on surfaces of the rotating member and also other surfaces in the separation space. The separation aid will, when it comes into contact with the gas to be separated, humidify the particles of the impurities and thus adhere to these through adsorption and/or absorption. This means that the weight and size of the particles increases, which, where the particles are very small and/or have a low density, may contribute to more easily separating them from the gas and transporting them out of the separation space. A further effect of the supply of the separation aid to the gas to be cleaned is that the humidification of the particles results in a lubrication of the particles by the liquid formed on the surface of the particles so that these will slide more easily on the surfaces of the rotating member and the separation space. Furthermore, it can be assumed that the surface structure of the particles is influenced by this humidification and adherence so that the risk that the impurities shall get burned or caught in any other manner to the surfaces of the rotating member and in the separation space is reduced.

An aerosol is defined as particles suspended in a gas. An aerosol thus comprises both the gas and particle phase. An upper limit for the particle size is defined by the fact that the particles are to be floating during some seconds in the gas before they precipitate which give them a size which is approximately 100 μm. The lower limit is defined when the particles becomes so small that they consist of individual molecules in the order of some nanometers. The particles which are included in the aerosol are in the present case liquid since they, as mentioned above, are to humidify the particles of the gas to be cleaned and adhere to these through adsorption or absorption.

According to an embodiment of the invention, the supply member is arranged to permit the supply of the separation aid to the inlet channel. It is advantageous to supply the separation aid before it reaches the separation space and the rotating member. In such a way, the separation aid will manage to humidify and adhere to the particles of the impurities before these reach the surfaces of the rotating member and also the surfaces in the separation space.

According to a further embodiment of the invention, the supply member is arranged to convert the separation aid supplied to the inlet channel to an aerosol. The supply member may for instance be arranged to convert a liquid, such as water, through heating or may comprise an aerosol nozzle through which the separation aid is supplied in such a way that the liquid, for instance water, is converted to an aerosol which is a mist with very small liquid particles.

According to a further embodiment of the invention, the supply member is arranged to permit continuous supply of the separation aid, i.e. the separation aid may be supplied continuously during the operation of the centrifugal separator. However, it is fully possible within the scope of the invention to let the supply take place intermittently.

According to a further embodiment of the invention, the supply member comprises a pipe element, which extends to the inlet channel and has a first end that is open to the inlet channel. Advantageously, the aerosol nozzle may be provided in the pipe element. Furthermore, the pipe element may have a second end and an end wall, wherein the aerosol nozzle is located between the end wall and the first end and wherein the end wall comprises a gap extending at least partly around the aerosol nozzle and forming an opening to an environment.

According to a further embodiment of the invention, the separation aid supplied to the inlet channel comprises an aerosol with water particles.

The rotating member comprises a number of separation discs. Such discs, rendering the separation more efficient, form a total relatively large surface of the rotating member, on which said particle can get caught.

According to a further embodiment of the invention, the centrifugal separation comprises a second outlet, which is provided downstream the first outlet and downstream the rotating member for discharging the separated impurities.

According to a further embodiment of the invention, the first outlet forms a main outlet and the second outlet forms a residual outlet.

According to a further embodiment of the invention, the centrifugal separator is arranged to be provided in such a manner that the axis of rotation extends substantially vertically, wherein the stationary casing has an upper end and a lower end and wherein the gas outlet is provided at the upper end.

According to a further embodiment of the invention, the first outlet is provided at the lower end.

The object is also achieved by the method initially defined, which is characterized in that a separation aid humidifying the particles, which aid is in form of an aerosol, is supplied to the gas to be cleaned.

BRIEF DESCRIPTION OF THE DRAWINGS

The invention is now to be explained more closely through a description of an embodiment shown by way of example, and with reference to the drawings attached hereto.

DETAILED DESCRIPTION OF AN EMBODIMENT

Figure 1:
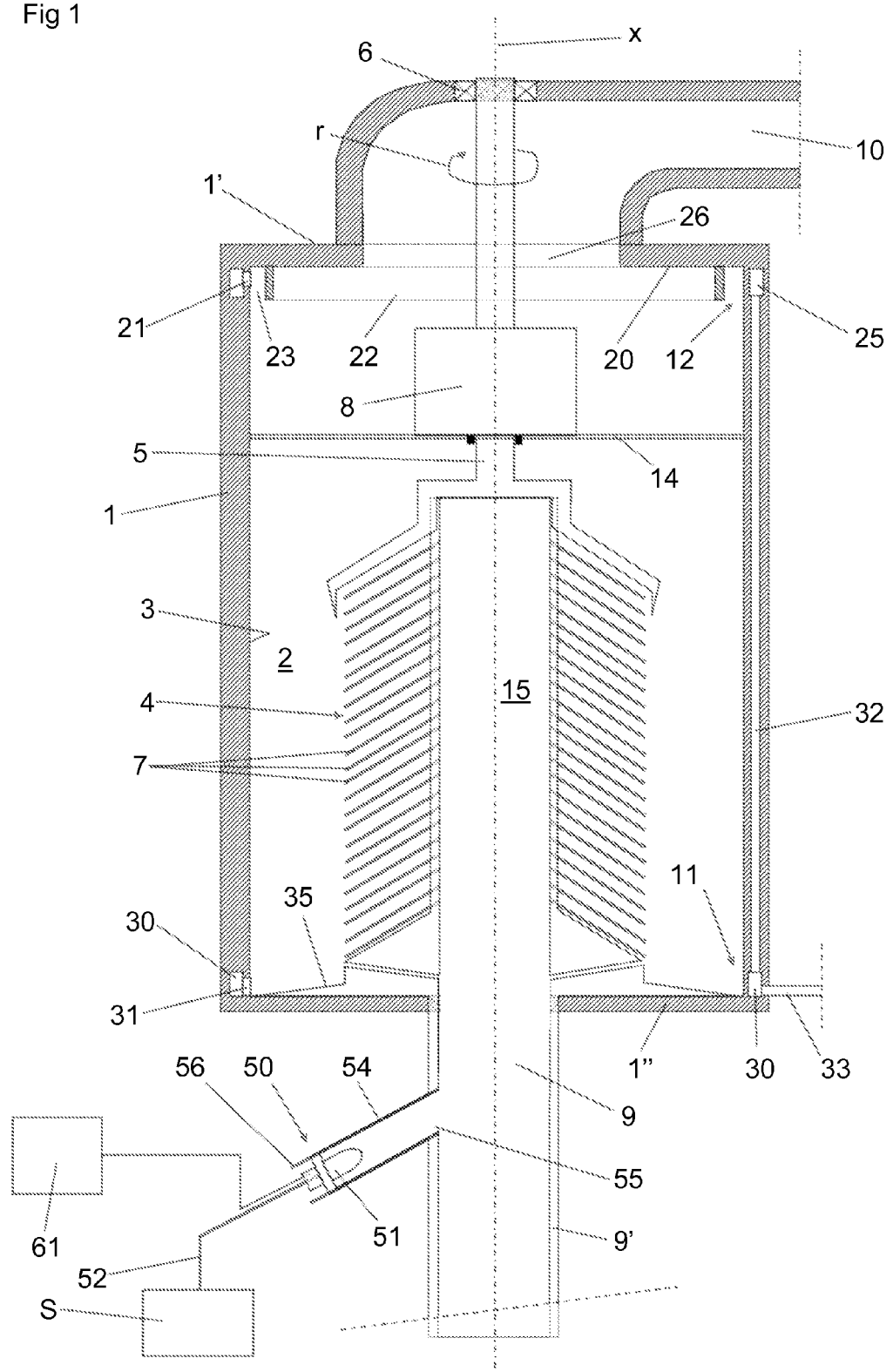
FIG. 1 discloses a vertical section through a centrifugal separator according to an embodiment of the invention.
Figure 2:
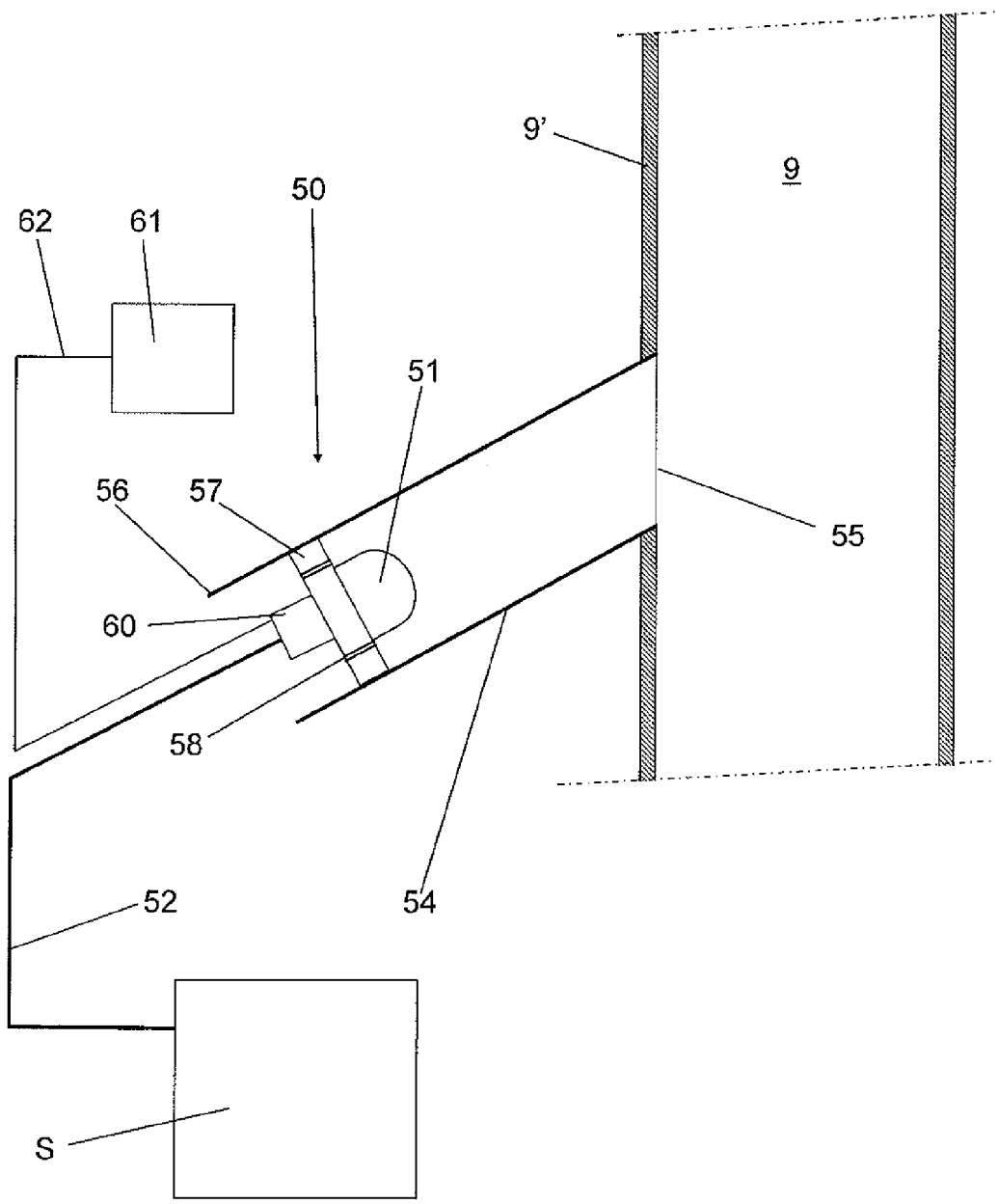
FIG. 2 discloses a sectional view of a supply member of the centrifugal separator in FIG. 1.

FIG. 1 discloses a centrifugal separator for cleaning of a gas containing impurities in the form of solid or liquid particles. The centrifugal separator comprises a stationary casing 1 which encloses a substantially closed separation space 2. The casing 1 has an inner wall surface 3 facing the separation space 2. The separation space 2 is arranged to permit the gas to flow therethrough.

The centrifugal separator further comprises a rotating member 4 which is provided in the separation space 2 and arranged to rotate in a direction r of rotation about an axis x of rotation which also forms a centre axis through the casing 1. The centrifugal separator is provided in such a manner that the axis x of rotation extends substantially vertically so that the stationary casing 1 has an upper end 1' and a lower end 1".

The rotating member 4 comprises a spindle member 5, which is journalled in the casing 1 in the proximity of the upper end 1' by means of a bearing 6. The rotating member 4 comprises a number of separation discs 7, which in the embodiment disclosed are conical and extending obliquely downwardly and outwardly from the spindle member 5. The invention is also applicable to rotating members having separation discs extending in axial planes from the spindle member 5. The separation discs 7 form relatively large surfaces on which the particles to be separated from the gas to be cleaned may be caught and transported outwardly towards the inner wall surface 3.

The rotating member 4 is driven by means of a drive member 8, for instance an electric motor, and is adapted to bring the gas to rotate in the direction r of rotation for separating, by means of centrifugal forces, the impurities from the gas. In the embodiment disclosed, the drive member 8 is mounted in the separation space 2 by means of a support device 14 which for instance may comprise three or more rods which extend radially from the drive member 8 to the inner wall surface 3 where they are mounted in a suitable manner.

In the embodiment disclosed, the centrifugal separator also comprises an inlet 9 for the gas to be cleaned, a gas outlet channel 10 for the cleaned gas, a first outlet 11 for the separated impurities and a second outlet 12 for the separated impurities.

The inlet 9 is provided centrally and extends through the lower end 1" of the casing 1. The inlet 9 conveys the gas in a central space 15 of the rotating member 4. From this central space 15, the gas is conveyed radially outwardly to the gaps formed between the separation discs 7. The gas outlet channel 10 is provided at the upper end 1' of the casing 1 downstream the rotating member 4. The gas leaving the gaps between the separation discs 7 thus rotates at a high rotation speed in the direction r of rotation and will continue this rotating movement upwardly to the gas outlet channel 10 where the cleaned gas leaves the separation space 2.

The first outlet 11 is provided at the lower end 1" of the casing 1 and with regarding to the gas flow upstream the second outlet 12 which is provided at the upper end 1', but downstream the gas outlet channel 10 with regard to the gas flow. In the embodiment disclosed, the first outlet 11 forms a main outlet, which is adapted for discharging a main part of the impurities, and the second outlet 12 forms a residual outlet adapted for discharging substantially all remaining impurities. It is to be noted that the separated impurities may contain both solid and liquid particles which are discharged via the outlets 11 and 12.

The centrifugal separator also comprises an annular surface 20 which extends inwardly from the inner wall surface 3. In the embodiment disclosed, the annular surface 20 is formed by the upper end wall of the separation space 2. The angular surface 20 is in the embodiment disclosed substantially planner and perpendicular to the axis x of rotation, i.e. the annular surface 20 is parallel to a cross-sectional plan through the centrifugal separator. The annular surface 20 may also be slightly conical or somewhat domed.

The second outlet 12 comprises one or several outlet holes 21 which extend out through the inner wall surface 3. The second outlet 12 also comprises an annular shield element 22 which extends from the annular surface 20 at a distance from the inner wall surface 3 and the outlet holes 21. As can be seen in FIG. 1, the annular shield element 22 is located radially inside the outlet holes 21, i.e. the shield element 22 covers the outlet holes completely or substantially completely seen in a radial direction from the axis of rotation. The shield element 22 extends in the embodiment disclosed substantially in parallel with the axis x of rotation but may also be inclined at least slightly in relation to the axis x of rotation.

The annular shield element 22 and the annular surface 20 thus form together with the inner wall surface 3 an annular channel 23 which is located radially inside the outlet holes 21. The channel 23 has an open annular upstream end and a closed annular downstream end. The annular surface 20 extends inwardly from the annular shield element 22, i.e. passing the shield element 22.

Furthermore, the second outlet 12 comprises a second annular collecting channel 25 which extends in a peripheral direction around the separation space 2 radially outside and at the level of the channel 23. The second annular collecting channel 25 is provided in the wall of the stationary casing 1. The channel 23 communicates with the second annular collecting channel 25 via the outlet holes 21 which thus extend between and connect the channel 23 and the second annular collecting channel 25.

The annular surface 20 comprises at least one opening 26 which is located inside the annular shield element 22. The opening 26 is designed as a central through flow opening and forms a part of the gas outlet channel 10.

The first outlet 12 comprises a first annular collecting channel 30, which extends around the separation space 2 radially outside the inner wall surface 3. Furthermore, at least one outlet hole 31 is provided to extend between the separation space 3 and the first annular collecting channel 30. The first outlet 11 may comprise one or several such outlet holes 31 provided at the lower end 1".

As can be seen in FIG. 1, the second annular collecting channel 25 of the second outlet 12 is connected to the first annular collecting channel 30 of the first outlet 11 via at least one connecting channel 32 which in the embodiment disclosed extends substantially in parallel with the axis x of rotation. It is of course possible to provide more than one such connecting channel 32. From the first annular collecting channel 30 also at least one discharge conduit 33 extends for discharging the separated impurities from the centrifugal separator.

The centrifugal separator also comprises a lower annular end surface 35 which extends between the rotating member 4 and the inner wall surface 3. The lower end surface 35 is configured to transport liquid impurities radially outwardly to the second outlet 12. The lower end surface 35 is in the embodiments disclosed slightly conical and slopes outwardly and downwardly, see FIG. 1. However, it is to be noted that the lower end surface 35 also may be substantially planar or even slope slightly outwardly and upwardly. Furthermore, the centrifugal separator may comprise a number of guide elements (not disclosed) provided on the lower end surface 35 and arranged to promote the transport of impurities outwardly towards the inner wall surface 3 and the outlet holes 31.

The centrifugal separator disclosed may for instance be used for cleaning of gases containing impurities in the form of solid particles or liquid particles such as oil particles and/or oil mist. The gas to be cleaned is then conveyed via the inlet 9 in to the space 15. Due to the rotation of the rotating member 4, the gas will also be sucked into the gaps between the separation discs 7, wherein oil will get caught on these discs 7 and due to the centrifugal force be transported outwardly on the discs 7. Thereafter, the oil leaves the discs 7 and are thrown towards the inner wall surface 3. The oil will then flow downwardly on the inner wall surface 3 to the lower end surface 50 and the first outlet 11 where the oil will flow out through the outlet holes 31 into the first annular collecting channel 30. A part of the oil which hits the inner wall surface 3 will, due to the gas flow from the rotating member upwardly to the gas outlet channel 10, be transported upwardly along the inner wall surface 3. This oil will flow into the channel 23 and be conveyed in the second annular collecting channel 25 via the outlet holes 21. From the second annular collecting channel 25 the separated oil is then transported down to the first annular collecting channel 30. All separated oil is thus transported to this collecting channel 30 and from there out of the centrifugal separator via the discharge conduit 33.

The centrifugal separator further comprises a supply member 50 which is configured to permit supply of a separation aid in the form of an aerosol to the gas to be cleaned. The separation aid may advantageously be an aerosol with water particles, but also aerosols based on other liquids could be used, such as oil or a viscosity decreasing substance.

The supply member 50 is arranged to permit the supply of the separation aid in the form of an aerosol into the inlet channel 9, i.e. to a position located upstream the inlet and outside the separation space proper. The separation aid is thus added to the gas to be cleaned before this gas reaches the separation space and the rotating member.

The supply member 50 is in the embodiment disclosed arranged to convert a separation aid supplied to the inlet channel to an aerosol by means of an aerosol nozzle 51, through which the separation aid is supplied. Such an aerosol nozzle 51 comprises a large number of small holes through which the separation aid, such as water, is pressed at a high pressure, which means that the pressure of the water is decreased so that the water is converted or vaporized.

According to an alternative embodiment, the supply member 50 may be arranged to convert the separation aid, such as water, to an aerosol with water particles through heating.

The supply member 50 comprises or is connected to a source S which may contain the separation aid, for instance water. Water may then be supplied to the aerosol nozzle 51 via a conduit 52 which extends between the source S and the aerosol nozzle 51.

The supply member 50 further comprises a pipe element 51, which is mounted to a pipe conduit 9' which forms the inlet channel 9. The pipe element 54 extends to the inlet channel 9 and has a first end 55, which is open to the inlet channel 9, and a second end 56, which is turned away from the first end 55 and from the inlet channel 9 and the pipe conduit 9'. The aerosol nozzle 51 is provided in the pipe element 54 between the first end 55 and the second end 56. The aerosol nozzle 51 comprises one or several nozzle openings extending in the direction towards the inlet channel 9.

Furthermore, the pipe element 54 has an end wall 57 at which the aerosol nozzle 51 is provided so that the aerosol nozzle 51, or at least the nozzle openings, is located between the end wall 57 and the first end 55. The end wall 57 comprises a gap 58 extending at least partly around the nozzle 51 and forming an opening to an environment. In such a way, air from the environment may be sucked into the pipe element 54 and be mixed with the separation aid and then with the gas to be cleaned.

The supply member 50 further comprises a valve member 60, for instance in the form of a magnet valve by means of which the supply of the aerosol may be controlled. The valve member 60 is connected to a control unit 61 via a connection conduit 62. The control unit 61 is arranged to control the valve member 60 and the supply of the separation aid, for instance an aerosol with water particles, in such a way that this aerosol is supplied continuously during the operation of the centrifugal separator. The control unit 61 may also be arranged to control the valve member 60 and the supply of the separation aid in such a way that this is supplied intermittently during the operation of the centrifugal separator.

The invention is not limited to the embodiments disclosed but may be varied and modified within the scope of the following claims.

What is claimed is:

1. A centrifugal separator for cleaning of a gas containing impurities in the form of solid and/or liquid particles, wherein the centrifugal separator comprises:
    a stationary casing, which encloses a separation space and permits the gas to flow therethrough, wherein the stationary casing has an inner wall surface facing the separation space;
    an inlet channel, which extends to the separation space and forms an inlet for the gas to be cleaned;
    a rotating member, which is provided in the separation space downstream the inlet with regard to the gas flow and arranged to rotate in a direction (r) of rotation about an axis (x) of rotation, wherein the rotating member comprises a number of separation discs and a central space, and is adapted to bring the gas to rotate in the direction (r) of rotation for separating by means of centrifugal forces at least a main part of the impurities from the gas, wherein the inlet channel is a central channel extending into the central space of the rotating member, wherein the separation discs form gaps between the separation discs through which the gas to be cleaned is conveyed via the inlet channel and the central space, and wherein the separation discs form surfaces on which the particles to be separated from the gas to be cleaned are caught and transported outwardly towards the inner wall surface;

a gas outlet channel, which with regard to the gas flow is provided downstream the rotating member for discharging the cleaned gas;

at least an impurities outlet, which is provided for discharging the impurities from the separation space; and a supply member which is configured to permit a supply of a separation aid humidifying the particles, which aid is in form of an aerosol, to the gas to be cleaned, wherein the supply member is arranged to permit the supply of the separation aid to the inlet channel, and to convert the separation aid supplied to the inlet channel to an aerosol;

wherein:

the supply member comprises an aerosol nozzle through which the separation aid is supplied and converted to the aerosol;

the supply member comprises a pipe element, which extends to the inlet channel and has a first end;

the first end of the pipe element is open to the inlet channel and discharges laterally into the inlet channel; and the aerosol nozzle is provided in the pipe element.

2. A centrifugal separator according to claim 1, wherein the supply member is arranged to permit continuous supply of the separation aid.

3. A centrifugal separator according to claim 1, wherein the pipe element has a second end and an end wall, wherein the aerosol nozzle is located between the end wall and the first end and wherein the end wall comprises a gap extending at least partly around the aerosol nozzle and forming an opening to an environment.

4. A centrifugal separator according to claim 1, wherein the separation aid supplied to the inlet channel comprises an aerosol with water particles.

5. A centrifugal separator according to claim 1, wherein the centrifugal separator comprises a second outlet which is provided downstream the impurities outlet and downstream the rotating member for discharging the separated impurities.

6. A centrifugal separator according to claim 5, wherein the impurities outlet forms a main outlet and the second outlet forms a residual outlet.

7. A centrifugal separator according to claim 1, wherein the centrifugal separator is arranged to be provided in such a manner that the axis (x) of rotation extends substantially vertically, wherein the stationary casing has an upper end and a lower end and wherein the gas outlet channel is provided at the upper end.

8. A centrifugal separator according to claim 1, wherein the impurities outlet is provided at the lower end.

9. A method for cleaning of a gas containing impurities in the form of solid and/or liquid particles by centrifugation in a centrifugal separator comprising a stationary casing, which encloses a separation space and permits the gas to flow therethrough, wherein the stationary casing has an inner wall surface facing the separation space, wherein the method comprises the steps of:

feeding the gas to be cleaned to the separation space through an inlet channel;

bringing the gas to rotation in the separation space by means of a rotating member, which comprises a number of separation discs and a central space, and is provided downstream the inlet channel with regard to the gas flow and rotates in a direction (r) of rotation about an axis (x) of rotation, wherein the inlet channel is a central channel extending into the central space of the rotating member, wherein the separation discs form gaps between the separation discs through which the gas to be cleaned is conveyed via the inlet channel and the central space, and wherein the separation discs form surfaces on which the particles to be separated from the gas to be cleaned are caught and transported outwardly towards the inner wall surface, and thereby separating at least a main part of the impurities from the gas by means of centrifugal forces;

discharging the cleaned gas from the separation space through a gas outlet channel; and discharging the impurities from the separation space through an impurities outlet;

causing a separation aid to humidify the particles, which aid is in form of an aerosol, and is supplied to the gas to be cleaned, wherein the separation aid is supplied to the inlet channel; and converting the separation aid supplied to the inlet channel to the aerosol by means of an aerosol nozzle through which the separation aid is supplied, wherein the aerosol nozzle is provided in a pipe element, which extends to the inlet channel and has a first end, wherein the first end of the pipe element is open to the inlet channel and discharges laterally into the inlet channel.

10. A method according to claim 9, wherein the separation aid is supplied continuously.

* * * * *